(12) United States Patent
D'Alo et al.

(10) Patent No.: US 7,568,036 B2
(45) Date of Patent: Jul. 28, 2009

(54) ADAPTIVE MANAGEMENT METHOD WITH AUTOMATIC SCANNER INSTALLATION

(75) Inventors: Salvatore D'Alo, Rome (IT);
Alessandro Donatelli, Rome (IT);
Claudio Marinelli, Aprilia (IT);
Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 11/289,110

(22) Filed: Nov. 29, 2005

(65) Prior Publication Data
US 2006/0168179 A1 Jul. 27, 2006

(30) Foreign Application Priority Data
Dec. 22, 2004 (EP) .................................. 04106852

(51) Int. Cl.
*G06F 15/173* (2006.01)
(52) U.S. Cl. ........................ 709/226; 709/223; 709/224
(58) Field of Classification Search .................. 709/226
See application file for complete search history.

(56) References Cited

U.S. PATENT DOCUMENTS

2002/0198980 A1* 12/2002 Najafi .......................... 709/224
2005/0198275 A1*  9/2005 D'Alo et al. ................. 709/224

* cited by examiner

*Primary Examiner*—Jeffrey Pwu
*Assistant Examiner*—Jeffrey Seto
(74) *Attorney, Agent, or Firm*—Grag IP Group, Inc.; Rakesh Garg; Jeffrey S. LaBaw

(57) ABSTRACT

A self-adaptive resource management method (200) is proposed. The method is based on an authority (105) that publishes multiple rules into a corresponding repository (115). Each rule defines a desired target configuration for a category of subjects (110); each category is specified by one or more attributes that are evaluated by corresponding scanners (233-239). Whenever new rules are published, a dedicated module (120) creates and publishes further rules for selectively installing the scanners that are required for evaluating the attributes included in the categories of the new rules. These further rules are defined according to an algorithm that attempts to minimize the cost involved by the installation of the scanners.

4 Claims, 7 Drawing Sheets

ADAPTIVE MANAGEMENT METHOD WITH AUTOMATIC SCANNER INSTALLATION

TECHNICAL FIELD

The present invention relates to the data processing field. More specifically, the present invention relates to the self-configuration of subject entities in a data processing system.

BACKGROUND ART

Management of different types of resources (such as software components, applications or devices) is a critical issue in a data processing system with a distributed architecture. This problem is particular acute when the system includes a high number of logical and/or physical entities (referred to as subjects), each one controlling different resources; the problem is further exacerbated if the subjects have a high level of complexity or are dispersed across a large number of installations.

The management environments known in that art are typically based on an enforcement model (also known as manager/workers model). In this model, the process is entirely controlled by an authority residing at a central site of the system. The authority defines a desired configuration of every subject. For this purpose, the authority accesses a central repository storing the (alleged) current configuration of each subject, and determines the management actions required to bring the subject to the desired configuration starting from its current configuration. The management actions are then enforced remotely by the authority on the subject (which is totally passive).

A different approach is proposed in WO-A-2004/017201; this document discloses an autonomic management system, wherein each subject self-adapts to the corresponding desired configuration. For this purpose, the authority publishes a set of rules into a shared repository; each rule specifies the desired configuration for a category of subjects. Each subject retrieves and applies the rules corresponding to its category directly. In this way, the subjects are no longer passive entities but they actively participate in the configuration process. As a consequence, it is possible to avoid inconsistencies and support subjects that are not available or off-line. In the above-described solution the control of the environment is fully automated and delegated to the subjects (with a system administrator that is required to intervene only when a malfunctioning occurs or when some subjects are unable to comply with the corresponding rules).

The categories are defined according to different attributes (or keys), which are representative of corresponding logical/physical characteristics of the subjects. Each attribute is evaluated by a respective scanner; therefore, the above-described solution requires that the scanners for evaluating the attributes specified in the rules should be installed on every subject.

For this purpose, the scanners may be deployed to all the subjects or they may be pre-installed on each new subject that is added to the system.

However, this approach impairs the proposed self-adaptive model.

In addition, the massive installation of the scanners on all the subjects is very ineffective, and can cause a serious degradation of the performance of the system. This drawback is particular acute in large systems with a heterogeneous structure, wherein the categories are defined by a high number of attributes.

SUMMARY OF THE INVENTION

According to the present invention, a self-adaptive approach for selectively installing the scanners is suggested.

Particularly, an aspect of the present invention proposes an autonomic management method; the method is used for self-configuring subject entities of a data processing system. The configuration of the subject entities is defined by rules, each one for a category of subject entities (specified by one or more attributes). The method starts with the step of publishing a set of resource rules; each resource rule defines a target state of a resource (or more). The method continues creating a set of scanner rules; each scanner rule defines the installation of a scanner (or more) for evaluating a corresponding attribute. The scanner rules are created according to the categories specified in the resource rules. The scanner rules are published as well. Each rule is then applied on each subject entity belonging to the category specified in the rule; this enforces the installation of the scanner defined in each scanner rule and the target state of the resource defined in each resource rule.

The proposed solution leverages the resource management model itself for installing the required scanners.

Moreover, this allows optimizing the process so as to reduce the number of subjects where the scanners must be installed (with beneficial effects on the performance of the system).

This advantage is clearly perceived in large systems with a heterogeneous structure, wherein the categories are defined by a high number of attributes.

The different embodiments of the invention described in the following provide additional advantages.

For example, the scanner rules are created and published in response to the detection of the publication of the resource rules.

The proposed implementation supports a scenario in which the rules may be published by multiple entities.

Preferably, the scanner rules are created according to a predetermined weight assigned to each attribute.

This provides very good results in a relatively simple manner.

A possible choice for implementing this algorithm involves determining eligible sets of the scanner rules, and then selecting one of them according to the weights.

The suggested technique is quite effective.

In a specific embodiment of the invention, the eligible sets are determined by expressing the definition of the categories as an OR-combination of one or more terms (each one expressed as an AND-combination of one or more attributes). A basic eligible set of the scanner rules is defined for each permutation of the attributes included in each term; each combination of the basic eligible sets is now determined. Any duplicated scanner rule is removed, and a set of combinations with the lowest number of scanner rules is then selected.

This algorithm is of general applicability in any situations.

Particularly, each basic eligible set is defined by creating an initial scanner rule (defining the installation of a scanner for evaluating an initial attribute of the corresponding permutation for all the subject entities), and one or more possible next scanner rules (defining the installation of a scanner for evaluating each next attribute of the permutation for a category specified by the assertion of each preceding attribute of the permutation).

This procedure ensures that all the possibilities are taken into account.

In a preferred embodiment of the invention, the eligible set is selected by optimizing a total weight of each scanner rule of the eligible sets (in increasing order of number of attributes).

The proposed algorithm provides the best result according to the available information.

The characterizing features of the present invention are set forth in the appended claims. The invention itself, however, as well as further features and advantages thereof will be best understood by reference to the following detailed description, given purely by way of a non-restrictive indication, to be read in conjunction with the accompanying drawings.

DETAILED DESCRIPTION OF THE PREFERRED EMBODIMENT(S)

Figure 1A:
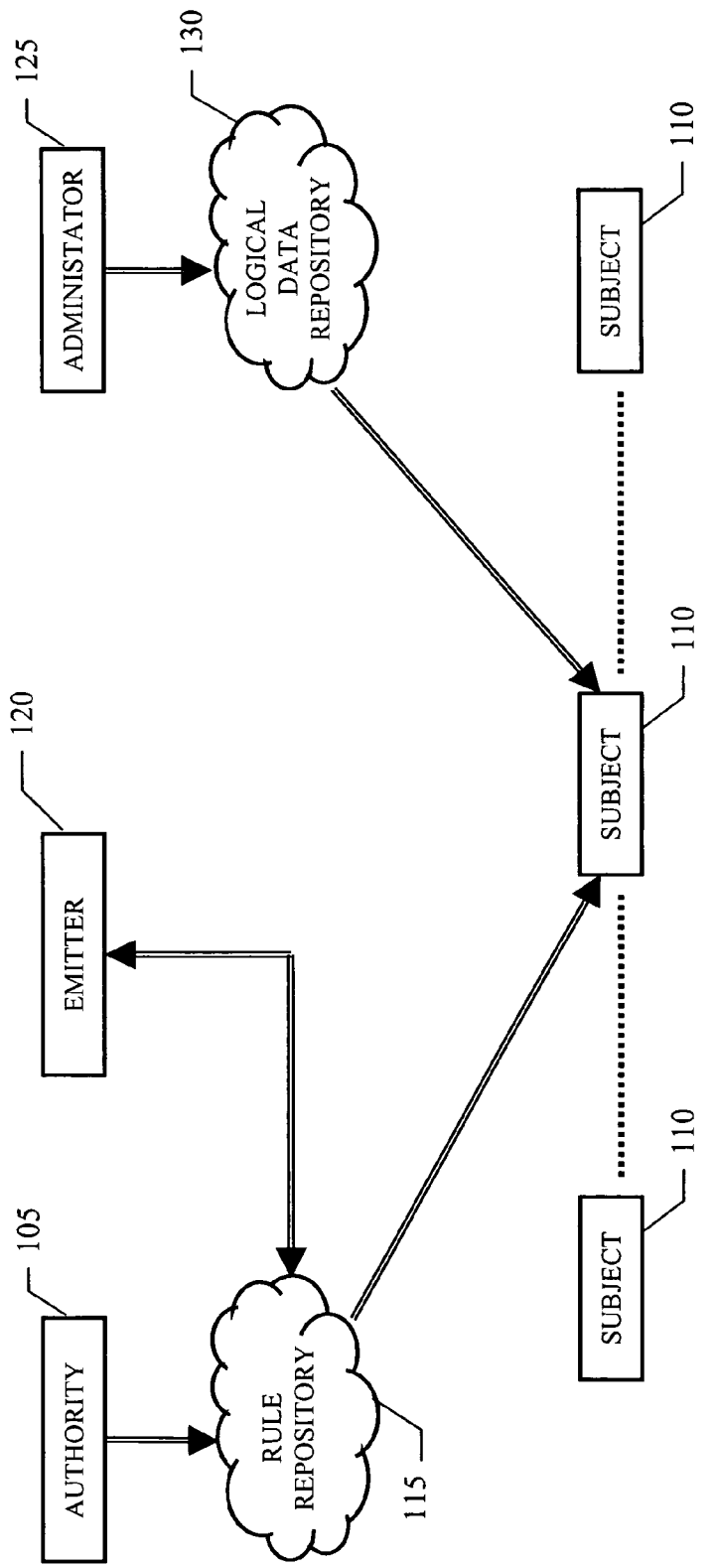
FIG. 1a is a schematic block diagram of a data processing system in which the solution according to an embodiment of the invention is applicable.

With reference in particular to FIG. 1a, a data processing system 100 with a distributed architecture (typically INTERNET-based) is shown. The system 100 implements an environment for managing several kinds of resources, such as products in a software distribution application or in a monitoring application, hardware devices, and the like.

A computer 105 operates as an authority, which is responsible to define a desired configuration of the system 100. Multiple computers 110 operate as heterogeneous subjects, which directly control one or more instances of different resources under management. Each subject 110 is defined by one or more characteristics of logical and/or physical entities (such as a desktop, a Personal Digital Assistant (PDA), a SIM card of a mobile telephone, every user of a workstation, and the like).

The authority 105 and the subjects 110 communicate in an associative way (at the information level). Particularly, the authority 105 publishes a set of rules (or laws) into a shared repository 115. Each rule defined a desired configuration for a category of subjects. The category is specified by one or more attributes (or keys), each one representative of a corresponding logical/physical characteristic of the subjects. On the other hand, the desired configuration is defined by a target state of specific resources (which instances are controlled by the subjects belonging to the category specified in the rule). The subjects 110 access the rule repository 115, in order to retrieve and apply the corresponding rules.

A preferred grammar that can be used for defining the rules is described in the above-mentioned document WO-A-2004/017201. Briefly, each rule includes a WHO clause (which defines the category associated with the rule) and a WHAT clause (which describes the resources to be configured by the rule and their target state). Typically, the WHO clause consists of a logical expression of one or more attributes (for example, combined with standard logical operators such as AND, OR, and NOT).

The rule repository 115 is also accessed by a computer 120 operating as an emitter. The emitter 120 detects any change in the content of the rule repository 115 (caused by either the addition or the removal of any rule). As described in detail in the following, the emitter creates a set of additional rules for selectively installing any scanner that is required for evaluating the attributes specified in the current rules. These additional rules (referred to as scanner rules hereinafter) are then published into the rule repository 115 as well.

A further computer 125 operates as an administrator, which is responsible to define logical characteristics of the subjects 110 dynamically. The administrator publishes the information into a (shared) logical data repository 130, which is accessed by the subjects 110.

The above-described repositories implement a peer-to-peer communication model, which totally decouples the different entities of the system 100 (authority 105, subjects 110, emitter 120 and administrator 125). Particularly, a destination decoupling results from the fact that the entities do not need to refer to each other explicitly (thereby providing a fully anonymous communication scheme); in other words, a mutual knowledge of the location of the different entities is not necessary. Moreover, time decoupling results from the fact that the entities do not need to be available at the same time.

Figure 1B:
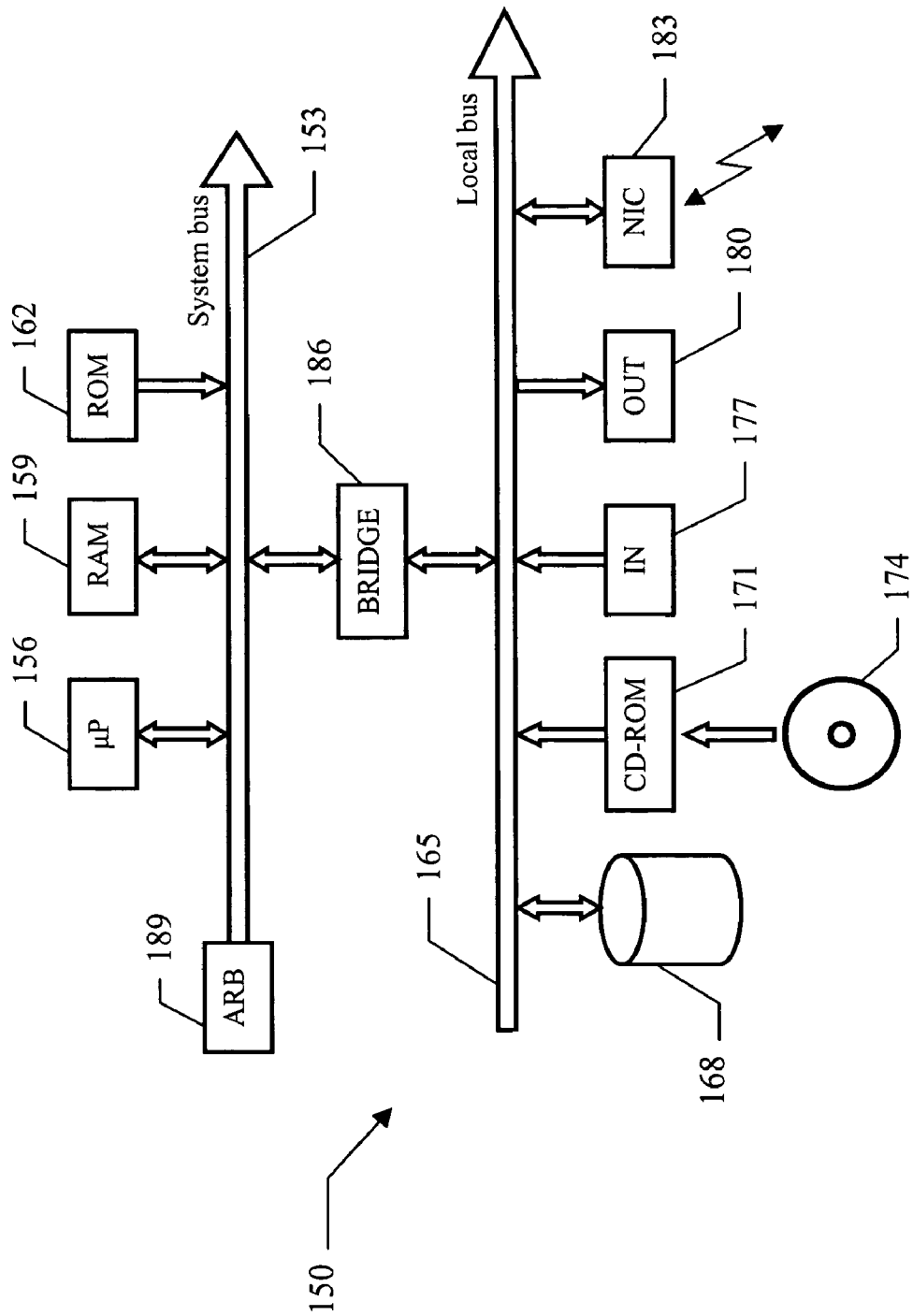
FIG. 1b shows the functional blocks of a generic computer of the system.

As shown in FIG. 1b, a generic computer of the system (authority, subject, emitter or administrator) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
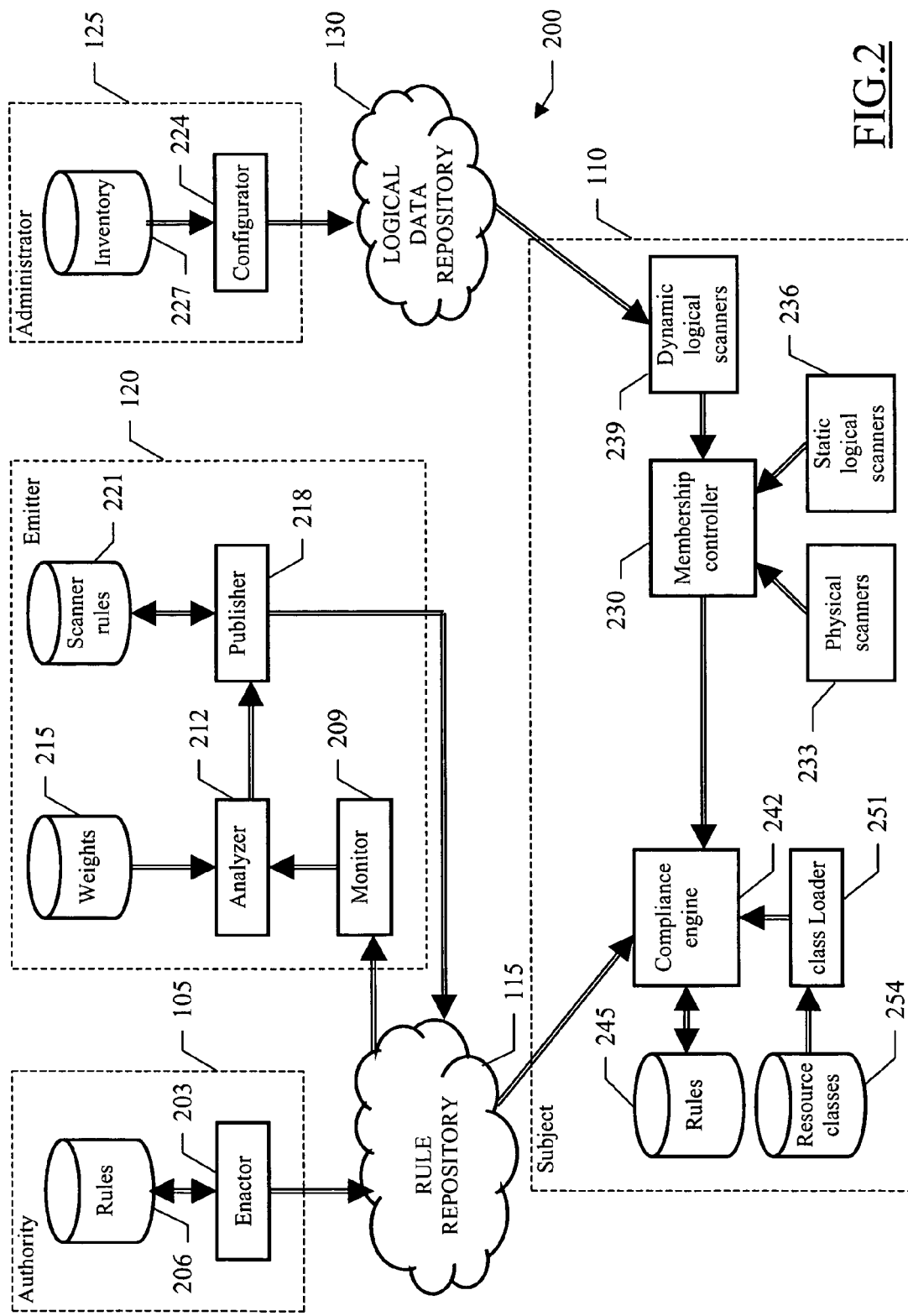
FIG. 2 depicts the main software components that can be used for practicing the solution according to an embodiment of the invention.

Considering now FIG. 2, the main software components that can be used for practicing the solution according to an embodiment of the invention are collectively denoted with the reference 200. The information (programs and data) is typically stored on the hard disks and loaded (at least partially) into the corresponding working memories when the programs are running. The programs are initially installed onto the hard disks from CD-ROMs.

Particularly, the authority 105 includes an enactor 203 for defining new solutions to be deployed in the system; each solution consists of a set of rules (for example, of the order of 100-200). The rules are stored into a corresponding log 206. The enactor 203 checks the semantic correctness of each rule of the set; if the rule is not in contrast to other rules (either of the same set or already published), the enactor 203 publishes the set of rules into the corresponding repository 115.

Passing to the emitter 120, a monitor 209 detects any change in the content of the rule repository 115 (typically defined by the addition, removal or update of a set of rules).

The monitor 209 notifies the event to an analyzer 212; at the same time, the monitor 209 extracts all the rules that are currently available in the repository 115, and passes them to the analyzer 212. The analyzer 212 accesses a table 215, which stores a predefined weight associated with each scanner required to evaluate a corresponding attribute. The weight represents a cost associated with the installation of the scanner; for example, the weight consists of a number (from 1 to 10) being set according to the size of the scanner, its running speed, the price of a corresponding license, and the like. The analyzer 212 creates a set of scanner rules corresponding to the whole rules in the repository 115, which scanner rules are supplied to a publisher 218. The publisher 218 controls a log 221 storing the scanner rules currently in force. The publisher 218 instructs the rule repository 115 to delete the (old) scanner rules indicated in the log 221; at the same time, the module 218 publishes the (new) scanner rules into the rule repository 115 and updates the log 221 accordingly.

With reference now to the administrator 125, a configurator 224 is used to set the dynamic logical characteristics of the subjects (which information is published into the corresponding repository 130). For this purpose, the configurator 224 accesses an inventory 227 storing information about the organization of a company wherein the system is used.

Preferably, each repository (i.e., the rule repository 115 and the logical data repository 130) is implemented as a Web application. Each entity can register with any desired repository submitting a corresponding identifier (typically consisting of a Globally Unique Identifier, or GUID), in order to receive any new relevant information automatically. For example, the subjects can register with the rule repository 115 (providing their category as well) and/or with the logical data repository; likewise, the emitter 120 can register with the rule repository 115 (through its monitor 209).

Considering now a generic subject 110, a membership controller 230 is used to assign the subject 110 to the respective category (according to its logical and/or physical characteristics). For this purpose, the membership controller 230 exploits different scanners (which are installed by means of corresponding scanner rules).

Particularly, a first set of scanners 233 evaluate corresponding attributes defined by physical characteristics of the subject 110. For example, the physical attributes are specified by hardware characteristics (such as a hard-disk size, a CPU model, or a working memory capacity) and/or software characteristics (such as installed applications, files or folders). For this purpose, the physical scanners 233 leverage a hardware inventory explorer, a software inventory explorer and an application explorer (not shown in the figure); those explorers can be either pre-installed on every subject or deployed by means of specific rules.

A different set of scanners 236 statically evaluate corresponding attributes defined by logical characteristics of the subject 110. For example, the static logical attributes specify different types of users (such as secretaries, managers, developers, system engineers) or different characteristics of physical entities (such as desktops, laptops, PDAs, mobile telephones); the static logical scanners 236 derive the category of the subject 110 from an identification code that is input during a login procedure or is hardwired.

Another set of scanners 239 dynamically evaluate corresponding attributes defined by logical characteristics of the subject 110. For this purpose, the dynamic logical scanners 239 interface with the corresponding repository 130. For example, the dynamic logical attributes specify a current function of the subject 110 in the system (such as a server or an agent in a monitoring application, a depot in a software distribution application, and the like).

A compliance engine 242 receives the information identifying the category of the subject 110 from the membership controller 230. The compliance engine 242 retrieves the rules relating to the category of the subject 110 from the corresponding repository 115. The retrieved rules are stored into a log 245. The compliance engine 242 controls the application of the rules (stored in the log 245) on the subject 110. For this purpose, the compliance engine 242 interfaces with a class loader 251; the module 251 loads (from one or more repositories, not shown in the figure) the definition of classes 254, which model the resources under management on the subject 110 (including the physical scanners 233, the static logical scanners 236 and the dynamic logical scanners 239). Particularly, each resource class 254 manages a state catalogue, which specifies the current state of the corresponding resource. The resource class 254 further accesses a transition table; for each pair current state/target state, the transition table indicates one or more management actions required to bring the resource from the current state to the target state. The compliance engine 242 updates the log 245 according to the result of the application of the rules; particularly, for each rule the log 242 stores information indicating whether the subject 110 is compliant or not with the rule.

Figure 3A:
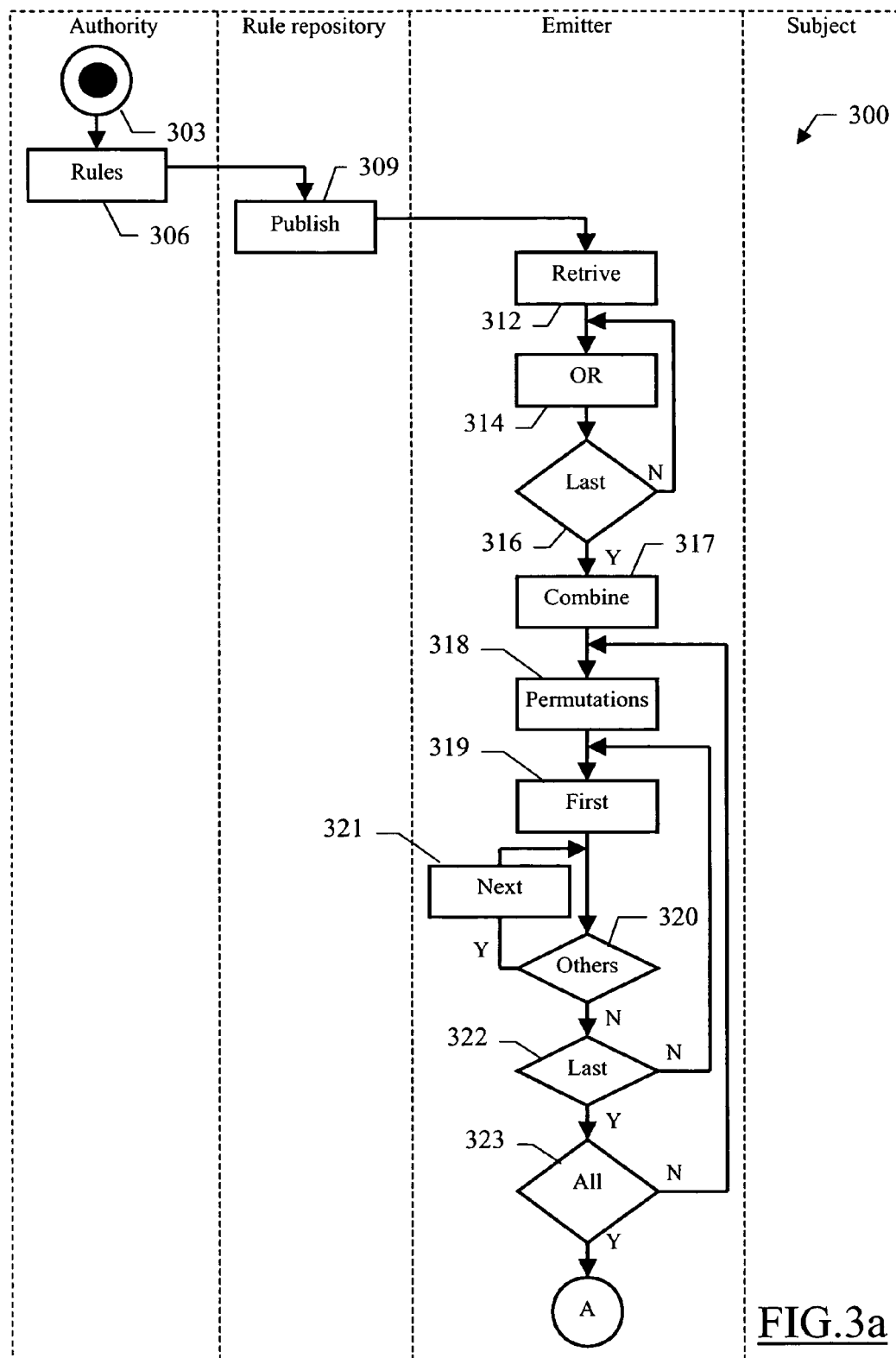
FIGS. 3a-3b show a diagram describing the flow of activities relating to an illustrative implementation of the solution according to an embodiment of the invention.
Figure 3B:
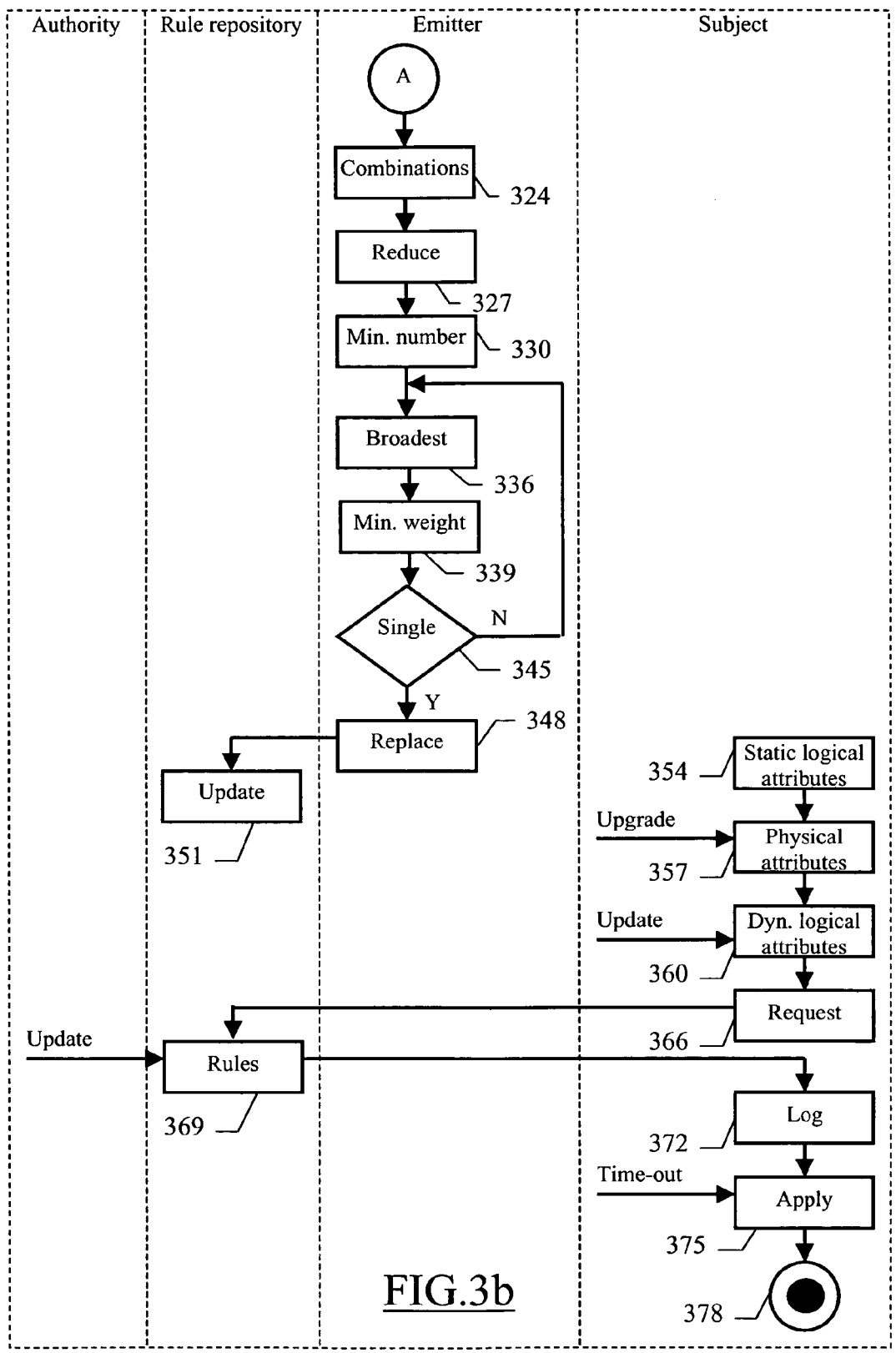

Considering now FIGS. 3a-3b, the logic flow of a resource management method implemented in the above-described system is represented with a method 300. The method begins at the black start circle 303 in the swim-lane of the authority. Descending into block 306, the authority defines the set of rules of a new solution. If the rules of the set are semantically correct, they are logged and then published at block 309 into the corresponding repository.

Moving now to block 312, the emitter detects the event (for example, being notified by the rule repository assuming that it has previously registered); in response thereto, the emitter retrieves all the rules that are currently available in the rule repository. A loop is then performed for each retrieved rule (starting from the first one); the loop begins at block 314 wherein the definition of the category specified in the rule is expressed as the combination in logical OR of one ore more terms (each one expressed as the combination in logical AND of one or more attributes). A test is made at block 316 to verify whether all the rules have been processed. If not, the method returns to block 314 for repeating the same operation on a next rule. Conversely, the method exits the above-described loop and descends into block 317; in this phase, the definitions of the categories of all the rules are combined into a single expression (based on the fact that the rules can be deemed in logical OR among them). Therefore, the category expression so obtained will always include the OR-combination of one or more terms (each one including the AND-combination of one or more attributes).

A further loop is then performed for each term of the category expression (starting from the first one); the loop begins at block 318 wherein each permutation of the attributes included in the term is calculated. Denoting with $N_i$ the number of attributes of the i-th term (with i=1 ... M, being M the number of terms in the category expression), we will have $N_i!$ permutations of the corresponding attributes $A_0, \ldots A_{Ni}$ (associated with respective scanners $S_0, \ldots S_{Ni}$).

For each permutation, the first attribute is extracted at block 319; a scanner rule is then defined for installing the scanner associated with the first attribute on all the subjects. Considering, for example, the permutation $\{A_0, A_1, A_2 \ldots A_{Ni}\}$ we will obtain the following rule:

$S_0 \leftarrow$ True (causing the installation of the scanner $S_0$ on the category specified by the value TRUE that is always asserted). A test is then made at block 320 to determine whether the last attribute of the permutation has been processed. If not, a next attribute is extracted from the permutation at block 321; a further scanner rule is then defined for installing the scanner associated with the next attribute on the subjects that satisfy each preceding attribute in the permutation. Therefore, in the example at issue we will obtain the following rule for the second attribute $A_1$:

$S_1 \leftarrow A_0$ (causing the installation of the scanner $S_1$ on the category specified by the assertion of the attribute $A_0$), the following rule for the third attribute $A_2$:

$S_2 \leftarrow A_0$ AND $A_1$ (causing the installation of the scanner $S_2$ on the category specified by the assertion of both the attributes $A_0$ and $A_1$), and so on. The method then returns to the test block 320.

Once the set of rules for installing the scanners associated with all the attributes of the permutation has been created, the flow of activity passes to block 322. If other permutations remain to be considered, the method returns to block 319 for creating the set of scanner rules associated with a next permutation. Conversely, a test is made at block 323 to verify whether all the terms of the category expression have been processed. If not, the method goes back to block 318 for reiterating the same operations on a next term.

The flow of activity exits the above-described loop at block 324 once the whole category expression has been analyzed. In this phase, each possible combination of the available sets of scanner rules is determined; as a result, $N_1! \cdot N_2! \ldots \cdot N_M!$ sets each one including $N_1! + N_2! \ldots + N_M!$ scanner rules are created. Continuing to block 327, each set is reduced by removing any duplicated scanner rule. The method then proceeds to block 330, wherein the sets including the lowest number of scanner rules are selected as eligible for the publication.

A loop is then performed in an attempt to optimize (i.e., minimize) a total weight of the set of scanner rules to be published. The loop starts at block 336, wherein the scanner rules relating to the alleged broadest category are taken into account. The extension of the category is defined by the number of attributes included in its definition. Therefore, the category with no attributes (i.e., TRUE for all the subjects) is considered at the first iteration of the loop. The set of scanner rules with the lowest weight of the corresponding scanner(s) to be installed are then selected at block 339. A test is now made at block 345 to verify whether a single set of scanner rules has been identified. If not, the method returns to block 336 for reiterating the above described optimization in increasing order of number of attributes; in other words, the same operations are repeated for the category including one attribute, two attributes, and so on.

Once the desired set of scanner rules has been selected, the method exits the loop by descending into block 348. In this phase, the emitter instructs the rule repository to delete the (old) scanner rules indicated in its log and to publish the (new) scanner rules, with the log that is updated accordingly. Preferably, this operation is carried out in a transactional way by locking all these scanner rules for the entire operation (thereby preventing the subjects to retrieve inconsistent information). In response thereto, the content of the rule repository is updated at block 351 (by substituting the new scanner rules for the old ones).

Moving now to the swim-lane of a generic subject, the available static logical scanners are activated at block 354 for evaluating the corresponding attributes. Likewise, the available physical scanners are activated at block 357 for evaluating the corresponding attributes; the same operation is also performed in response to the notification of a software and/or hardware upgrade carried out on the subject. The process continues to block 360, wherein the available dynamic logical scanners are activated for evaluating the corresponding attributes; the same point is also reached whenever updated information is published into the logical data repository for the subject (under the control of the administrator); in this way, the subject is promptly notified of any change in its dynamic logical attributes (assuming that the subject has previously registered with the logical data repository).

The flow of activities continues to block 366, wherein the subject requests the rules for its category (defined by the attributes so obtained) to the rule repository (including any relevant scanner rule). Moving to the swim-lane of the rule repository, the desired rules are retrieved and returned to the subject at block 369, so as to implement a pull mode of operation. The same point is also reached whenever new rules are published for the category of the subject (under the control of the authority); in this way, the subject is promptly notified of any relevant new rule (assuming that the subject has previously registered with the rule repository), so as to implement a reactive mode of operation. Returning to the swim-lane of the subject, the received rules are logged at block 372.

The rules logged on the subject are then applied at block 375 (either for bringing generic resources to their target state of for installing new scanners). This operation is performed according to a trail-and-fail algorithm (as described in the above-mentioned document WO-A-2004/017201), which allows resolving any dependencies among the management actions automatically. The same activity is also performed whenever a predetermined time-out expires (for example, every day). In this way, the new rules are applied on the subject as soon as they are received; in addition, all the rules are periodically re-applied, so as to implement a healing mode of operation. In brief, for each pending rule the current state of the corresponding resource is at first detected. A list of the actions needed to bring the resource to the target state (specified in the rule) from its current state is extracted from the corresponding transition table. These actions are then executed on the subject. The entry of the state catalogue for the resource is updated accordingly; moreover, if the application of the rule has been successful (bringing the resource to the desired target state) the corresponding log is updated to indicate that the subject is now complaint with the rule. The method then ends at the concentric white/black stop circles 378.

For example, let us assume that the categories of the current rules are specified as:

$A_0$ AND $A_1$
$A_1$ AND $A_2$ AND $A_3$

This results in the following category expression:

$(A_0$ AND $A_1)$ OR $(A_1$ AND $A_2$ AND $A_3)$

Therefore, the set of scanner rules for the permutations (2!=2) of the attributes included in the first term $(A_0, A_1)$ will be:

$S_0 \leftarrow$ True; $S_1 \leftarrow A_0$
$S_1 \leftarrow$ True; $S_0 \leftarrow A_1$ while the set of scanner rules for the permutations (3!=6) of the attributes included in the second term $(A_1, A_2, A_3)$ will be:

$S_1 \leftarrow$ True; $S_2 \leftarrow A_1$; $S_3 \leftarrow A_1$ AND $A_2$
$S_1 \leftarrow$ True; $S_3 \leftarrow A_1$; $S_2 \leftarrow A_1$ AND $A_3$
$S_2 \leftarrow$ True; $S_1 \leftarrow A_2$; $S_3 \leftarrow A_2$ AND $A_1$
$S_2 \leftarrow$ True; $S_3 \leftarrow A_2$; $S_1 \leftarrow A_2$ AND $A_3$ $S_3 \leftarrow$ True; $S_1 \leftarrow A_3$; $S_2 \leftarrow A_3$ AND $A_1$
$S_3 \leftarrow$ True; $S_2 \leftarrow A_3$; $S_1 \leftarrow A_3$ AND $A_2$ All the possible combinations (2·6=12) of the available sets of scanner rules are then:

$S_0 \leftarrow$ True; $S_1 \leftarrow A_0$; $S_1 \leftarrow$ True; $S_2 \leftarrow A_1$; $S_3 \leftarrow A_1$ AND $A_2$
$S_0 \leftarrow$ True; $S_1 \leftarrow A_0$; $S_1 \leftarrow$ True; $S_3 \leftarrow A_1$; $S_2 \leftarrow A_1$ AND $A_3$
$S_0 \leftarrow$ True; $S_1 \leftarrow A_0$; $S_2 \leftarrow$ True; $S_1 \leftarrow A_2$; $S_3 \leftarrow A_2$ AND $A_1$
$S_0 \leftarrow$ True; $S_1 \leftarrow A_0$; $S_2 \leftarrow$ True; $S_3 \leftarrow A_2$; $S_1 \leftarrow A_2$ AND $A_3$
$S_0 \leftarrow$ True; $S_1 \leftarrow A_0$; $S_3 \leftarrow$ True; $S_1 \leftarrow A_3$; $S_2 \leftarrow A_3$ AND $A_1$
$S_0 \leftarrow$ True; $S_1 \leftarrow A_0$; $S_3 \leftarrow$ True; $S_2 \leftarrow A_3$; $S_1 \leftarrow A_3$ AND $A_2$
$S_1 \leftarrow$ True; $S_0 \leftarrow A_1$; $S_1 \leftarrow$ True; $S_2 \leftarrow A_1$; $S_3 \leftarrow A_1$ AND $A_2$
$S_1 \leftarrow$ True; $S_0 \leftarrow A_1$; $S_1 \leftarrow$ True; $S_3 \leftarrow A_1$; $S_2 \leftarrow A_1$ AND $A_3$
$S_1 \leftarrow$ True; $S_0 \leftarrow A_1$; $S_2 \leftarrow$ True; $S_1 \leftarrow A_2$; $S_3 \leftarrow A_2$ AND $A_1$
$S_1 \leftarrow$ True; $S_0 \leftarrow A_1$; $S_2 \leftarrow$ True; $S_3 \leftarrow A_2$; $S_1 \leftarrow A_2$ AND $A_3$
$S_1 \leftarrow$ True; $S_0 \leftarrow A_1$; $S_3 \leftarrow$ True; $S_1 \leftarrow A_3$; $S_2 \leftarrow A_3$ AND $A_1$
$S_1 \leftarrow$ True; $S_0 \leftarrow A_1$; $S_3 \leftarrow$ True; $S_2 \leftarrow A_3$; $S_1 \leftarrow A_3$ AND $A_2$ The removal of any duplicated scanner rule provides:

$S_0 \leftarrow$ True; $S_1 \leftarrow A_0$; $S_1 \leftarrow$ True; $S_2 \leftarrow A_1$; $S_3 \leftarrow A_1$ AND $A_2$
$S_0 \leftarrow$ True; $S_1 \leftarrow A_0$; $S_1 \leftarrow$ True; $S_3 \leftarrow A_1$; $S_2 \leftarrow A_1$ AND $A_3$
$S_0 \leftarrow$ True; $S_1 \leftarrow A_0$; $S_2 \leftarrow$ True; $S_1 \leftarrow A_2$; $S_3 \leftarrow A_2$ AND $A_1$
$S_0 \leftarrow$ True; $S_1 \leftarrow A_0$; $S_2 \leftarrow$ True; $S_3 \leftarrow A_2$; $S_1 \leftarrow A_2$ AND $A_3$
$S_0 \leftarrow$ True; $S_1 \leftarrow A_0$; $S_3 \leftarrow$ True; $S_1 \leftarrow A_3$; $S_2 \leftarrow A_3$ AND $A_1$
$S_0 \leftarrow$ True; $S_1 \leftarrow A_0$; $S_3 \leftarrow$ True; $S_2 \leftarrow A_3$; $S_1 \leftarrow A_3$ AND $A_2$
$S_1 \leftarrow$ True; $S_0 \leftarrow A_1$; $S_2 \leftarrow A_1$; $S_3 \leftarrow A_1$ AND $A_2$
$S_1 \leftarrow$ True; $S_0 \leftarrow A_1$; $S_3 \leftarrow A_1$; $S_2 \leftarrow A_1$ AND $A_3$
$S_1 \leftarrow$ True; $S_0 \leftarrow A_1$; $S_2 \leftarrow$ True; $S_1 \leftarrow A_2$; $S_3 \leftarrow A_2$ AND $A_1$
$S_1 \leftarrow$ True; $S_0 \leftarrow A_1$; $S_2 \leftarrow$ True; $S_3 \leftarrow A_2$; $S_1 \leftarrow A_2$ AND $A_3$
$S_1 \leftarrow$ True; $S_0 \leftarrow A_1$; $S_3 \leftarrow$ True; $S_1 \leftarrow A_3$; $S_2 \leftarrow A_3$ AND $A_1$
$S_1 \leftarrow$ True; $S_0 \leftarrow A_1$; $S_3 \leftarrow$ True; $S_2 \leftarrow A_3$; $S_1 \leftarrow A_3$ AND $A_2$ Therefore, two eligible sets of rules (denoted with $G_a$ and $G_b$, respectively) are obtained:

$G_a$) $S_1 \leftarrow$ True; $S_0 \leftarrow A_1$; $S_2 \leftarrow A_1$; $S_3 \leftarrow A_1$ AND $A_2$
$G_b$) $S_1 \leftarrow$ True; $S_0 \leftarrow A_1$; $S_3 \leftarrow A_1$; $S_2 \leftarrow A_1$ AND $A_3$ Let us assume now that the following weight table has been defined:

$S_0 = 3$
$S_1 = 1$
$S_2 = 2$
$S_3 = 7$

In this case, the total weights for the scanner rules relating to all the subjects in the two eligible sets are the same:

$G_a$) 1 ($S_1$)
$G_b$) 1 ($S_1$)

Therefore, the search of the preferred eligible set continues with the scanner rules relating to the category including a single attribute:

$G_a$) 3($S_0$)+2($S_2$)=5
$G_b$) 3($S_0$)+7($S_3$)=10

The first eligible set of rules (having the lowest total weight) is then selected for the publication.

It should be noted that in some specific situations the above-described algorithm might not provide the best results, since it does not minimize the total weight of the scanners that are actually installed. However, these situations cannot be ascertained a priori. Indeed, let us consider the simple case in which two scanners $S_0$ and $S_1$ must be installed for evaluating the properties $A_0$ and $A_1$, respectively. The corresponding eligible sets of scanner rules are then:

$G_a$) $S_0 \leftarrow$ True; $S_1 \leftarrow A_0$
$G_b$) $S_1 \leftarrow$ True; $S_0 \leftarrow A_1$ The total weight of the two eligible sets of scanner rules is then:

$G_a$) $W \cdot P_0 + X_0 \cdot P_1$
$G_b$) $W \cdot P_1 + X_1 \cdot P_0$ where W is the total number of subjects, $X_0$ and $X_1$ are the number of subjects where the respective attributes $A_0$ and $A_1$ are asserted (with $0 \leq X_0 \leq W$ and $0 \leq X_1 \leq W$), and $P_0$ and $P_1$ are the weights of the scanners $S_0$ and $S_1$, respectively.

The total weights of the two eligible sets are the same when:

$W \cdot P_0 + X_0 \cdot P_1 = W \cdot P_1 + X_1 \cdot P_0$

Figure 4A:
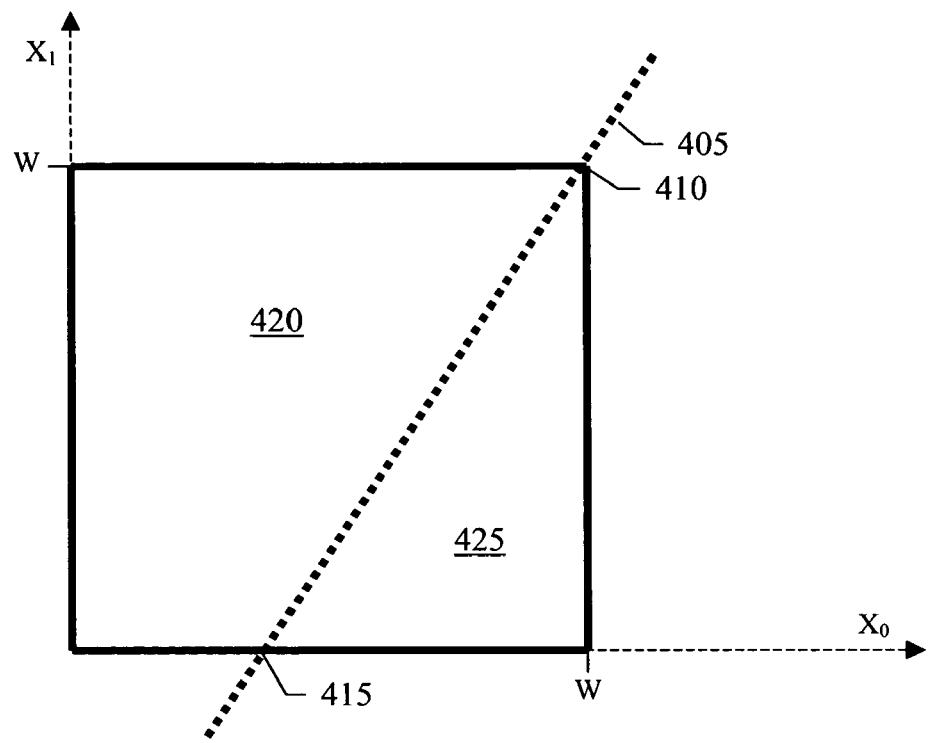
FIGS. 4a-4b are exemplary diagrams explaining a selection algorithm implemented by the solution according to an embodiment of the invention.

As shown in FIG. 4a, this function (in terms of the variables $X_0$ and $X_1$) is graphical represented by a line 405. The line 405 always passes through the point (W, W), denoted with 410, and crosses the axis $X_0$ at a point ($W(P_1-P_0)/P_1$, 0), denoted with 415. An area 420 represents the cases in which $W \cdot P_0 + X_0 \cdot P_1 < W \cdot P_1 + X_1 \cdot P_0$ (so that the first eligible set $G_a$ would be preferred) and an area 425 represents the cases in which $W \cdot P_0 + X_0 \cdot P_1 > W \cdot P_1 + X_1 \cdot P_0$ (so that the second eligible set $G_b$ would be preferred). Assuming that $P_0 < P_1$, the point 415 falls in the positive portion of the axis $X_0$, so that the area 420 is always larger than the area 425. This justifies the selection of the first eligible set $G_a$ (since it provides better results statistically). The area 425 now represents the cases in which the choice of the other eligible set $G_b$ would have provided better results; if the line 405 is not vertical (i.e., $P_0 <> 0$), this area 425 is not empty.

Figure 4B:
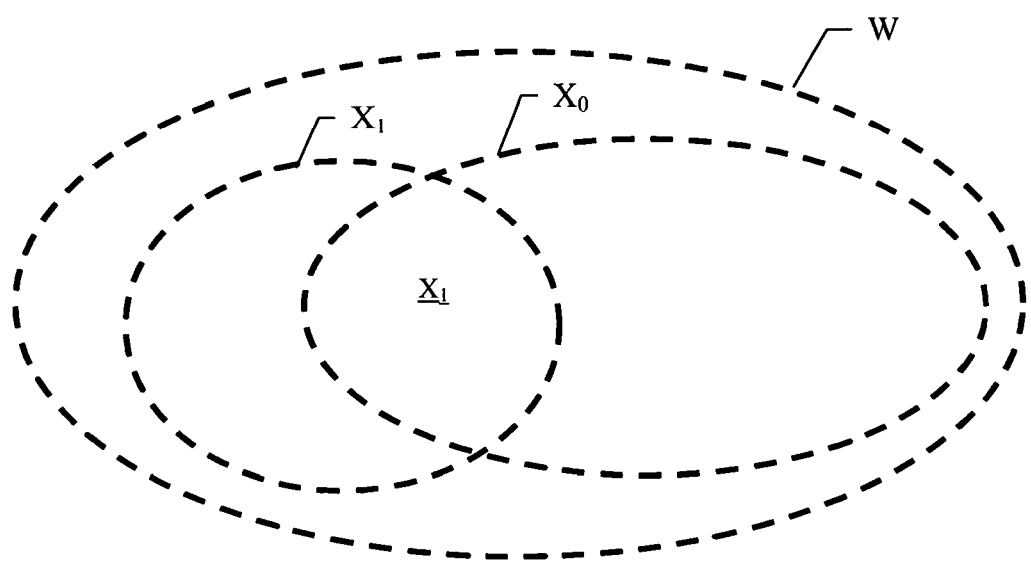

As shown in FIG. 4b, the number of subjects $X_0$ and $X_1$ where the respective attributes $A_0$ and $A_1$ are asserted are generally subsets of the total number of subjects W. We now denote with $X_0$ and $X_1$ the number of subjects for which it is actually possible to know whether the respective attributes $A_0$ and $A_1$ are asserted (because the corresponding scanners $S_0$ and $S_1$ are installed). In the example at issue, $X_0 = X_0$ since the scanner $S_0$ is installed on all the subjects. Conversely, $X_1 \leq X_1$ since the attribute $A_1$ can be evaluated only on the subjects where the scanner $S_1$ is installed (i.e., the subjects where the attribute $A_0$ is asserted); indeed, some subjects might exist where the attribute $A_1$ is asserted but the corresponding scanner $S_1$ is not installed (unless the subjects $X_1$ are a subset of the subjects $X_0$).

Therefore, even if in a specific situation we should have measured that $W \cdot P_0 + X_0 \cdot P_1 > W \cdot P_1 + X_1 \cdot P_0$, that is $W \cdot P_0 + X_0 \cdot P_1 > W \cdot P_1 + X_1 \cdot P_0$, it is not possible to kwon whether $W \cdot P_0 + X_0 \cdot P_1 > W \cdot P_1 + X_1 \cdot P_0$ as well (being $X_1 \leq X_1$). Therefore, we cannot determine whether the choice of the other eligible set $G_B$ would have provided better results.

Figure 5:
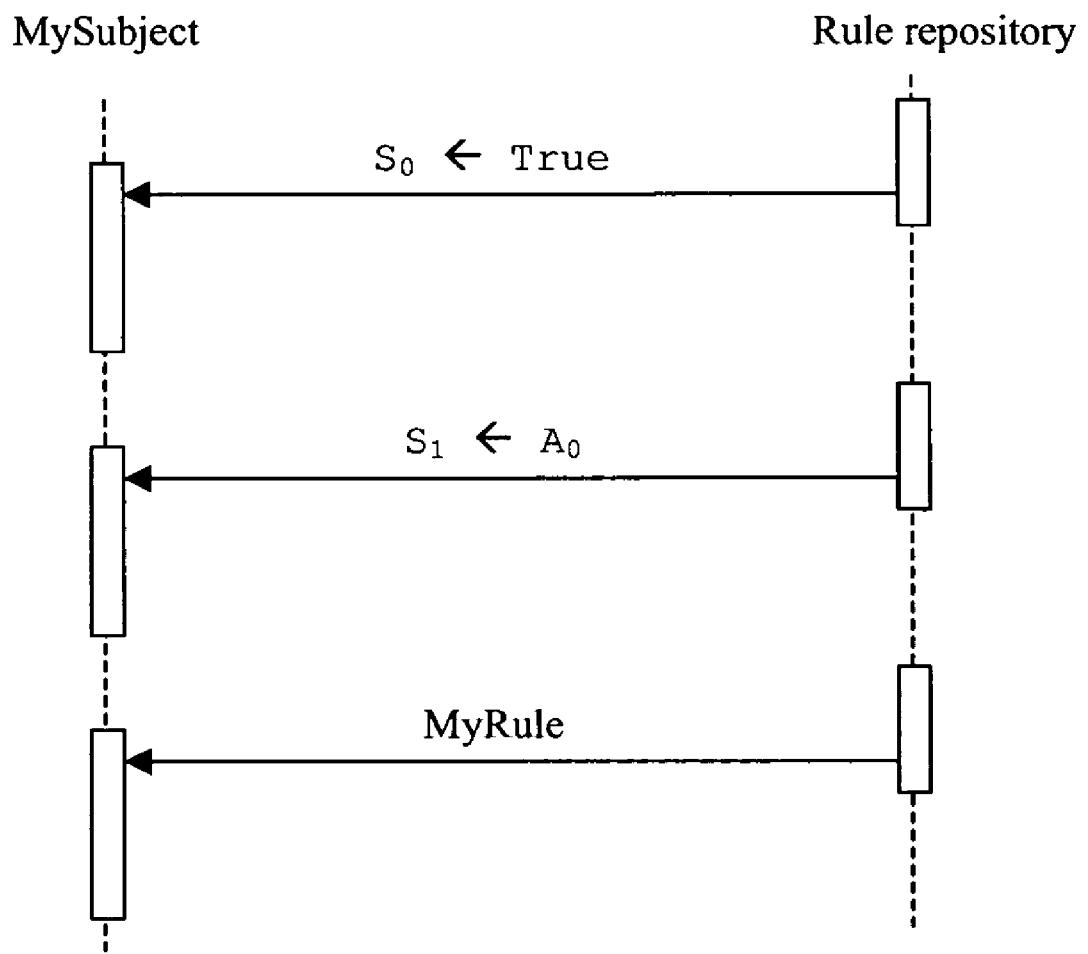
FIG. 5 illustrates a sequence diagram of an exemplary application of the solution according to an embodiment of the invention.

An exemplary application of the above-described method is illustrated in the sequence diagram of FIG. 5. In this case, the publication of a rule "MyRule" for the subjects belonging to the category specified by the expression "$A_0$ AND $A_1$" has been published. The corresponding scanner rules have been selected as:

$S_0 \leftarrow$ True; $S_1 \leftarrow A_0$

Let us consider a generic subject "MySubject" for which both the attributes $A_0$ and $A_1$ are asserted, but no scanner is installed yet. Therefore, the subject "MySubject" at first retrieves (from the rule repository) and applies the scanner rule "$S_0 \leftarrow$ True". After the scanner $S_0$ has been installed and the corresponding attribute $A_0$ has been evaluated (to true), the subject "MySubject" retrieves and applies the other scanner rule "$S_1 \leftarrow A_0$". Once both the scanners $S_0$ and $S_1$ are installed, the attributes $A_0$ and $A_1$ are both evaluated to true; as a result, the subject "MySubject" can then retrieve and apply the desired rule "MyRule". It should be noted that this result is achieved automatically, without the need of establishing any workflow for the application of the rules.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply the system has a different structure or it is based on equivalent elements; likewise, each computer can have another structure or it can be replaced with any data processing entity (such as a PDA, a mobile phone, and the like). Moreover, the solution of the invention is also suitable to be used in a system wherein two or more authorities are provided, the authority and the administrator simply consist of different roles played by a single entity, or the different repositories are consolidated into a single structure.

In any case, other attributes are feasible and the categories can be specified according to any other combination of physical and/or logical characteristics of the subject; likewise, each rule can relate to two or more resources or scanners.

Similar considerations apply if the publication of the rules is detected in another way (for example, periodically polling the rule repository).

Moreover, whatever other weights can be associated with the scanners.

The principles of the invention also apply to equivalent techniques either for determining the eligible sets or for selecting the desired one.

Similar considerations apply if the programs implementing the above-described solution are structured in a different way, or if additional blocks or functions are provided; likewise, the different memory structures can be of different types, or can be replaced with equivalent entities (not necessarily consisting of physical storage media). Moreover, the proposed solution can implement an equivalent method (for example, with similar or additional steps).

In any case, it is possible to distribute the programs in any other computer readable medium (such as a DVD).

Moreover, it will be apparent to those skilled in the art that the additional features providing further advantages are not essential for carrying out the invention, and may be omitted or replaced with different features.

For example, in a different implementation of the invention the scanner rules can be created by the authority directly (without the need to monitor the rule repository).

Even though in the preceding description reference has been made to the use of weights for selecting the scanner rules, this is not to be intended as a limitation (with the invention that is suitable to be implemented with algorithms based on other criteria).

In any case, the use of different techniques for defining the scanner rules is within the scope of the invention.

For example, it is possible to limit the number of combinations of the sets of scanner rules (so as to reduce the computational complexity accordingly). Moreover, in the described embodiment of the invention the scanners that are not necessary any longer remain installed on the subjects (and must be removed manually); alternatively, it is possible to add further rules for disinstalling these scanners (which rules are deleted after a predefined period or when the corresponding scanners have been disinstalled from all the subjects).

Similar considerations apply if the programs are preloaded onto the hard-disks, are sent to the computers through a network, are broadcast, or more generally are provided in any other form directly loadable into the working memories of the computers.

At the end, the method according to the present invention leads itself to be carried out with a hardware structure (for example, integrated chips of semiconductor material), or with a combination of software and hardware.

The invention claimed is:

1. An autonomic management method for self-configuring subject entities of a data processing system, the configuration of the subject entities being defined by rules each one for a category of subject entities being specified by at least one attribute, wherein the method includes the steps of:
    publishing a set of resource rules each one defining a target state of at least one resource;
    creating a set of scanner rules each one defining the installation of at least one scanner for evaluating a corresponding attribute, the scanner rules being created according to the categories specified in the resource rules, wherein the scanner rules are created according to a predetermined weight being assigned to each attribute, the creating including determining a plurality of eligible sets of the scanner rules, and selecting one of the eligible sets according to the weights;
    publishing the scanner rules;
    applying each rule on each subject entity belonging to the category specified in the rule to enforce the installation of the at least one scanner defined in, each scanner rule and the target state of the at least one resource defined in each resource rule.

2. The method according to claim 1, wherein the step of determining the eligible sets includes:
    expressing the definition of the categories specified in the resource rules as an OR-combination of at least one term, each term being expressed as an AND-combination of at least one attribute;
    defining a basic eligible set of the scanner rules for each permutation of the at least one attribute included in each term;
    determining each combination of the at least one basic eligible set;
    removing each duplicated scanner rule in each combination; and
    selecting a set of combinations with the lowest number of scanner rules.

3. The method according to claim 2, wherein the step of defining each basic eligible set includes:
    creating an initial scanner rule defining the installation of a scanner for evaluating a first attribute of the corresponding permutation for a category specified by all the subject entities; and
    creating a next scanner rule defining the installation of a scanner for evaluating each next attribute of the permutation for a category specified by the assertion of each preceding attribute of the permutation.

4. The method according to any claim 1, wherein the step of selecting the eligible set includes:
    optimizing a total weight of each scanner rule of the eligible sets in increasing order of number of attributes.

* * * * *